(12) United States Patent
Newey et al.

(10) Patent No.: US 12,136,197 B2
(45) Date of Patent: Nov. 5, 2024

(54) NEURAL NETWORK SYSTEMS AND METHODS FOR REMOVING NOISE FROM SIGNALS

(71) Applicant: Massachusetts Institute of Technology, Cambridge, MA (US)

(72) Inventors: Michael Newey, Chelmsford, MA (US); Prafull Sharma, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 329 days.

(21) Appl. No.: 17/519,929

(22) Filed: Nov. 5, 2021

(65) Prior Publication Data

US 2022/0138911 A1 May 5, 2022

Related U.S. Application Data

(60) Provisional application No. 63/109,988, filed on Nov. 5, 2020.

(51) Int. Cl.
| | |
|---|---|
| *G06T 5/70* | (2024.01) |
| *G01S 17/89* | (2020.01) |
| *G06N 3/045* | (2023.01) |
| *G06N 3/088* | (2023.01) |
| *G06T 5/50* | (2006.01) |

(52) U.S. Cl.
CPC .............. *G06T 5/70* (2024.01); *G01S 17/89* (2013.01); *G06N 3/045* (2023.01); *G06N 3/088* (2013.01); *G06T 5/50* (2013.01); *G06T 2207/20081* (2013.01); *G06T 2207/20084* (2013.01); *G06T 2207/20224* (2013.01)

(58) Field of Classification Search
CPC . G06T 5/002; G06T 5/50; G06T 2207/20081; G06T 2207/20084; G06T 2207/20224; G01S 17/89; G06N 3/045; G06N 3/088
See application file for complete search history.

(56) References Cited

U.S. PATENT DOCUMENTS

| | | | |
|---|---|---|---|
| 11,790,492 B1* | 10/2023 | Ahmad | G06T 5/50 |
| 2015/0347871 A1* | 12/2015 | Sathyendra | G06F 18/254 |
| | | | 382/103 |
| 2016/0267349 A1* | 9/2016 | Shoaib | G06T 5/50 |
| 2019/0236763 A1* | 8/2019 | Chan | G06T 5/50 |
| 2019/0295295 A1* | 9/2019 | Hyun | A61B 8/5215 |
| 2020/0234080 A1* | 7/2020 | Ciller Ruiz | G06N 3/08 |
| 2021/0003700 A1* | 1/2021 | Zhai | G06N 3/045 |

(Continued)

OTHER PUBLICATIONS

M. Newey and P. Sharma, "Self-supervised Speckle Reduction GAN for Synthetic Aperture Radar," 2021 IEEE Radar Conference (RadarConf21), Atlanta, GA, USA, 2021, pp. 1-6, (Year: 2021).*

(Continued)

*Primary Examiner* — Gandhi Thirugnanam
(74) *Attorney, Agent, or Firm* — DALY, CROWLEY, MOFFORD & DURKEE, LLP

(57) ABSTRACT

A neural network is used to remove noise from a data signal. The noise removed by the neural network is compared to simulated noise that represents noise expected to be present in the data signal. The results of the comparison are used to train the neural network and improve its ability to remove noise from the data signal.

23 Claims, 4 Drawing Sheets

(56) References Cited

U.S. PATENT DOCUMENTS

| | | | |
|---|---|---|---|
| 2021/0118098 A1* | 4/2021 | Chan | G06T 5/70 |
| 2022/0058803 A1* | 2/2022 | Bhattacharya | G06T 5/50 |
| 2022/0138911 A1* | 5/2022 | Newey | G06N 3/08 |
| | | | 382/100 |

OTHER PUBLICATIONS

H. Zhong, J. Xu, L. Jiao, Classification based nonlocal means despeckling for sar image, Institution of Intelligent Information Processing and Key Laboratory of Intelligent Perception and Image Understanding of Ministry of Education, Xidian University, Xi'an 710071, China, Oct. 2009, 9 pages.

Xiao-Jiao Mao, Chunhua Shen, Yu-Bing Yang, Image Restoration Using Very Deep Convolutional Encoder-Decoder Networks with Symmetric Skip Connections, 2016, 9 pages.

Puyang Wang, Student Member, IEEE, He Zhang, Student Member, IEEE, Vishal M. Patel, Senior Member, IEEE, SAR Image Despeckling Using a Convolutional Neural Network, vol. 24, No. 12, pp. 1763-1767, 2017, 5 pages.

Giovanni Chierchia, Davdie Cozzolino Poggi, Luisa Verdoliva, SAR image despeckling through convolutional neural networks, 2017, 5 pages.

S. Foucher, M. Beaulieu, M. Dahmane, F. Cavayas, Deep Speckle Noise Filtering, IEEE Geoscience and Remote Sensing Symposium (IGARSS), 2017, pp. 5311-5314, 5 pages.

Puyang Wang, Student Member, IEEE, He Zhang, Student Member, IEEE, Vishal M. Patel, Senior Member, IEEE, Generative Adversarial Network-Based Restoration of Speckled SAR Images, IEEE $7^{th}$ International Workshop on Computational Advances in Multi-Sensor Adaptive Processing, (CAMSAP) 2017, pp. 1-5, 5 pages.

J. Lehtinen, J. Munkberg, J. Hasselgren, S. Laine, T. Karras, M. Aittala, T. Aila, Noise2Noise: Learning Image Restoration without Clean Data, 2018, 12 pages.

Samuli Laine, Tero Karras, Jaako Lehtinen, Timo Aila, High-Quality Self-Supervised Deep Image Denoising, in Advances in Neural Information Processing System, 2019, pp. 6970-6980, 11 pages.

D. Ulyanov, A. Vedaldi, V. Lempitsky, Deep Image Prior, in Proceedings of the IEEE Conference on Computer Vision and Pattern Recognition, 2018, pp. 9446-9454, 22 pages.

Jon-Sen. Lee, Speckle analysis and smoothing of synthetic aperture radar images, Computer Graphics and Image Processing, vol. 17, 1981, pp. 24-31, 10 pages.

Jong-Sen Lee, Digital Image Enhancement and Noise Filtering by Use of Local Statistics, IEEE Transaction on Pattern Analysis and Machine Intelligence, vol. PAMI-2, No. 2, 1980, pp. 165-168, 4 pages.

Prithvijit Chakrabarty, Subhransu Maji, The Spectral Bias of the Deep Image Prior, arXiv preprint arXiv, 1912.08905, 2019, 7 pages.

Sergey Ioffe, Chriatian Szegedy, Batch Normalization: Accelerating Deep Network Training by Reducing Internal Covariate Shift, arXiv preprint arXiv: 1502.03167, 2015, 9 pages.

Kaiming He, Xiangyu Zhang, Shaoqing Ren, Jian Sun, Delving Deep into Rectifiers Surpassing Human-Level Performance on ImageNet Classification, in Proceedings of the IEEE International conference on computer vision, 2015, pp. 1-26-1034, 9 pages.

Diederik P. Kingma, Jimmy Lei Ba, Adam: A Method For Stochastic Optimization, arXiv, preprint arXiv: 1412.6980, 2014, 15 pages.

Kaiming He, Xiangyu Zhang, Shaoqing Ren, Jian Sun, Deep Residual Learning for Image Recognition, in 2016 IEEE Conference on Computer Vision and Pattern Recognition (CVPR), 2016, pp. 770-778, 9 pages.

Michael Wilmanski, Chris Kreucher, Jim Lauer, Modern Approaches in Deep Learning for SAR ATR, in Algorithms for Synthetic Aperture Radar Imagery XXIII, E. Zelnio and F.D. Garber, Eds., vol. 9843, International Society for Optics and Photonics, SPIE 2016, pp. 195-204, 10 pages.

Joseph A. O'Sullivan, Michael D. DeVore, Vikas Kedia, Michael I. Miller, SAR ATR Performance Using a Conditionally Guassin Model, IEEE Transactions on Aerospace and Electronic Systems, vol. 37, No. 1, 2001, pp. 91-108, 18 pages.

Ciuc et al., "Adaptive-Neighborhood Speckle Removal in Multitemporal Synthetic Aperture Radar Images"; Applied Optics, vol. 40, Issue 32; Nov. 10, 2001; pp. 5954-5966 (13 pages).

Rattanasuwan et al., "An SAR Image Speckle Removal Algorithm via Image Segmentation"; $6^{th}$ International Conference of Information and Communication Technology for Embedded Systems (IC-ICTES), 2015; pp. 1-4 (4 pages).

Choi et al., "Speckle Noise Removal Technique in SAR Images Using SRAD and Weighted Least Squares Filter"; $28^{th}$ International Symposium on Industrial Electronics (ISIE); Jun. 2019; pp. 1441-1446 (6 pages).

Argenti et al., "A Tutorial on Speckle Reduction in Synthetic Aperture Radar Images"; IEEE Geoscience and Remote Sensing Magazine, vol. 1, No. 3; Sep. 2013; pp. 6-35 (30 pages).

Parikh et al., "Analysis of Denoising Techniques For Speckle Noise Removal in Synthetic Aperture Radar Images"; International Conference on Advances in Computing, Communications and Informatics (ICACCI); Sep. 2018; pp. 671-677 (7 pages).

Blacknell et al., "Speckle Reduction of SAR Images Using Neural Networks"; $5^{th}$ International Conference on Image Processing and its Applications; Jul. 1995; pp. 647-651 (5 pages).

Zhang et al., "Learning Synthetic Aperture Radar Image Despeckling Without Clean Data"; Journal of Applied Remote Sensing, vol. 14(2); Apr.-Jun. 2020 (21 pages).

\* cited by examiner

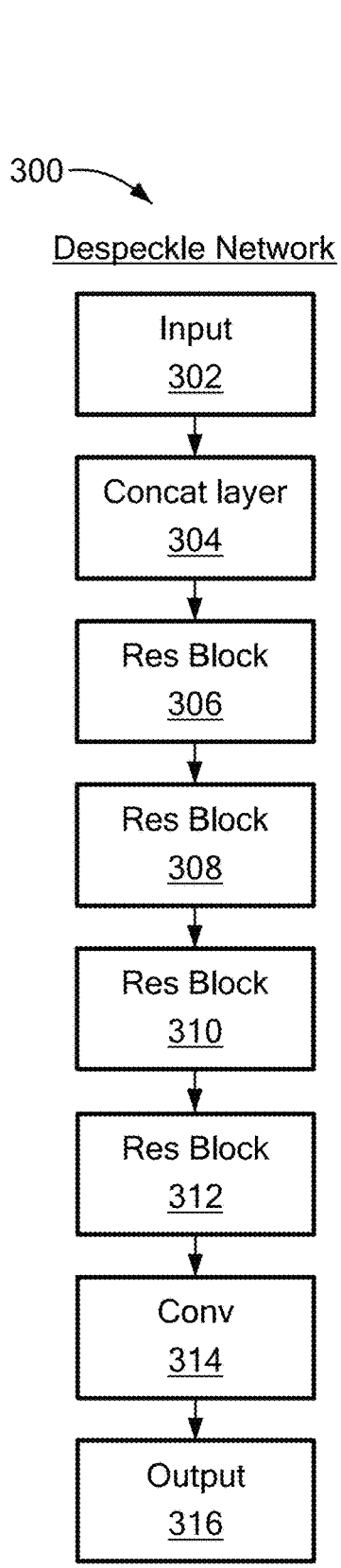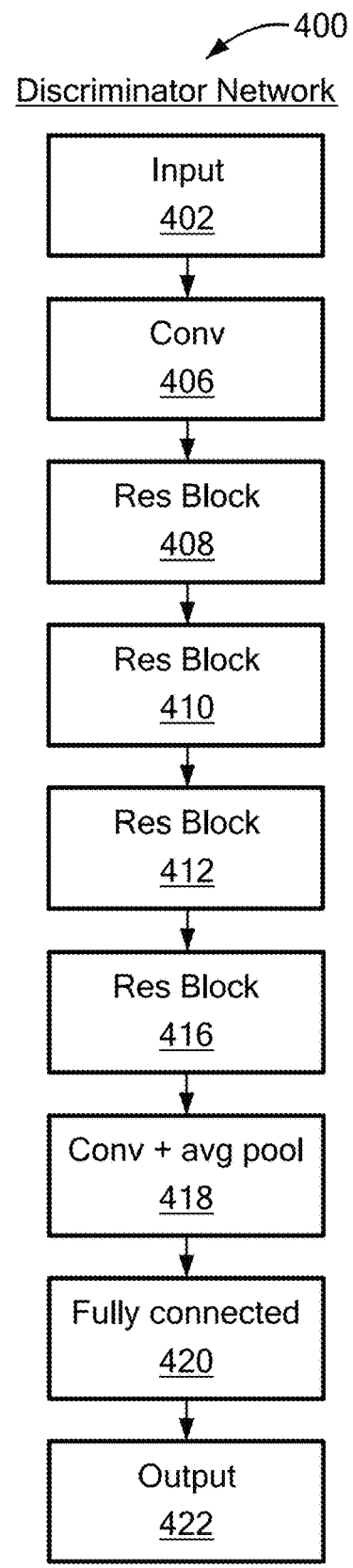
*FIG. 3*  *FIG. 4*

NEURAL NETWORK SYSTEMS AND METHODS FOR REMOVING NOISE FROM SIGNALS

RELATED APPLICATIONS

This patent application claims priority to and benefit of U.S. Provisional Patent Application No. 63/109,988 (filed Nov. 5, 2020), which is incorporated herein by reference in its entirety.

STATEMENT REGARDING FEDERALLY SPONSORED RESEARCH

This invention was made with government support under FA8750-19-2-1000 awarded by the Air Force Office of Scientific Research. The government has certain rights in the invention.

FIELD

This disclosure relates to removing noise from data and, more particularly, to removing noise such as speckle from radar images.

BACKGROUND

Noise reduction in radar images is required due to the ubiquity of noise in radar data. For example, speckle (a type of noise generated by reflections and refractions of electromagnetic radar signals) is present in synthetic aperture radar ("SAW") systems, inverse synthetic aperture radar ("ISAR") systems, moving target indication radar ("MTI") systems, and similar system.

Noise such as speckle can create difficulty in interpreting the radar image. Thus, various filtering techniques are currently used to smooth radar images by reducing, or ideally removing, the noise. In some cases, such noise removal is performed by a neural network. Training the neural network is often performed by evaluating loss in the output image itself. Many noise removal systems (such as noise removal systems associated with radar images, for example) rely on clean (e.g. noise-free) images for training. But these images often do not exist for many systems because noise is present in the data received by the system. Other noise removal algorithms require multiple noisy images, which also often do not exist. Also, there is the possibility that the systems that rely on noisy images could train on spikes in the noise data, which can result in errors.

SUMMARY

In embodiments, using a noise signal to train a neural network that removes noise from a data source may provide faster and more effective training for the neural network. The neural network may be trained, for example, by comparing the noise that was removed by the neural network to noise that is expected to be present in the data source. The expected noise can be simulated using a noise simulator that creates noise typical of the data source. To achieve these benefits, various systems and methods may be used.

In an embodiment, a method for removing noise from a data signal includes: (a) receiving a first data signal that contains noise; (b) removing, by a neural network, the noise from the data signal to produce a processed data signal that represents the first data signal without the noise; (c) calculating, from the first data signal and the processed data signal, a first noise signal representing the noise from the first data signal; (d) generating a simulated noise signal; (e) generating a comparison value by comparing the noise signal and the simulated noise signal, the comparison value representing a correspondence between characteristics of the noise signal and the simulated noise signal; and (f) training the neural network with the comparison value to improve performance of the neural network in producing the processed data signal.

One or more of the following features may be included.

Generating the simulated noise signal may include simulating the noise signal having characteristics corresponding to characteristics of the first noise signal.

The first data signal may represent an image having pixels and generating the simulated noise signal comprises simulating noise by superimposing effects of multiple point scatterers in one or more pixels of the simulated noise signal.

Generating the simulated noise signal may include simulating noise using a circularly complex Gaussian noise model.

Generating the simulated noise signal may include applying a taper function to the simulated noise signal.

Training the neural network may further include training the neural network with one or more of: an adversarial loss value, a histogram loss value, a sum smooth loss value, or a smoothness loss value.

The first data signal may represent an image and calculating the first noise signal may include calculating a difference between the first data signal and the processed data signal.

The data signal may represent a radar image, the noise contained in the data signal may include speckle; and the simulated noise signal may include simulated speckle.

The step of generating the comparison value may be performed by a second neural network.

In another embodiment, a system for removing noise from a data signal includes a first neural network configured to: receive a first data signal that includes noise; process the first data to remove the noise; and produce a processed data signal representing the first data signal without the noise. A processor is configured to generate a noise signal representing the noise included in the data signal; generate a simulated noise signal; and compare the noise signal with the simulated noise signal to generate a comparison signal that represents a correspondence between characteristics of the noise signal and characteristics of the simulated noise signal. The first neural network is trained with the comparison signal to improve the ability of the first neural network to remove noise from data signals.

One or more of the following features may be included.

The processor may be configured to implement a second neural network, and the second neural network may be configured to compare the noise signal with the simulated noise signal and generate the comparison signal.

The second neural network may be a discriminatory neural network.

The first neural network may be further configured to produce a second data signal representing the first data signal without the noise.

The processor may be configured to generate the noise signal by calculating a difference between the first data signal and the processed data signal.

The first data signal may represent a radar image and the noise is speckle in the radar image.

The first neural network may be a self-supervised training network.

The first neural network may be a generative adversarial network.

The simulated noise signal may be simulated by using a circularly complex Gaussian noise model.

In another embodiment, a method of training a neural network to remove speckle from radar images includes receiving data representing a radar image; removing, by the neural network, speckle from the data representing the radar image to produce a despeckled image; generating a speckle signal by subtracting the despeckled image from the radar image; generating a simulated speckle signal; comparing the speckle signal to the simulated speckle signal to generate a comparison value representing a correspondence between characteristics of the speckle signal and characteristics of the simulated speckle signal; and training the neural network with the comparison value. The neural network may be a generative adversarial network.

In another embodiment, a method of despeckling a radar image includes receiving data representing a radar image; processing, by a neural network, the data to remove speckle from the radar image; step means for generating a speckle signal the removed speckle; generating a simulated speckle signal; step means for generating a comparison value by comparing the speckle signal to a simulated speckle signal; and using the comparison value to train the neural network to improve the ability of the neural network to remove speckle from images.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided Figures depict one or more exemplary embodiments. Accordingly, the Figures are not intended to limit the scope of the invention. Like numbers in the Figures denote like elements.

FIG. 3 is a block diagram of an architecture of a neural network for removing noise from a data signal.

FIG. 4 is a block diagram of an architecture of a neural network for comparing a noise signal to a simulated noise signal.

DETAILED DESCRIPTION

Figure 1:
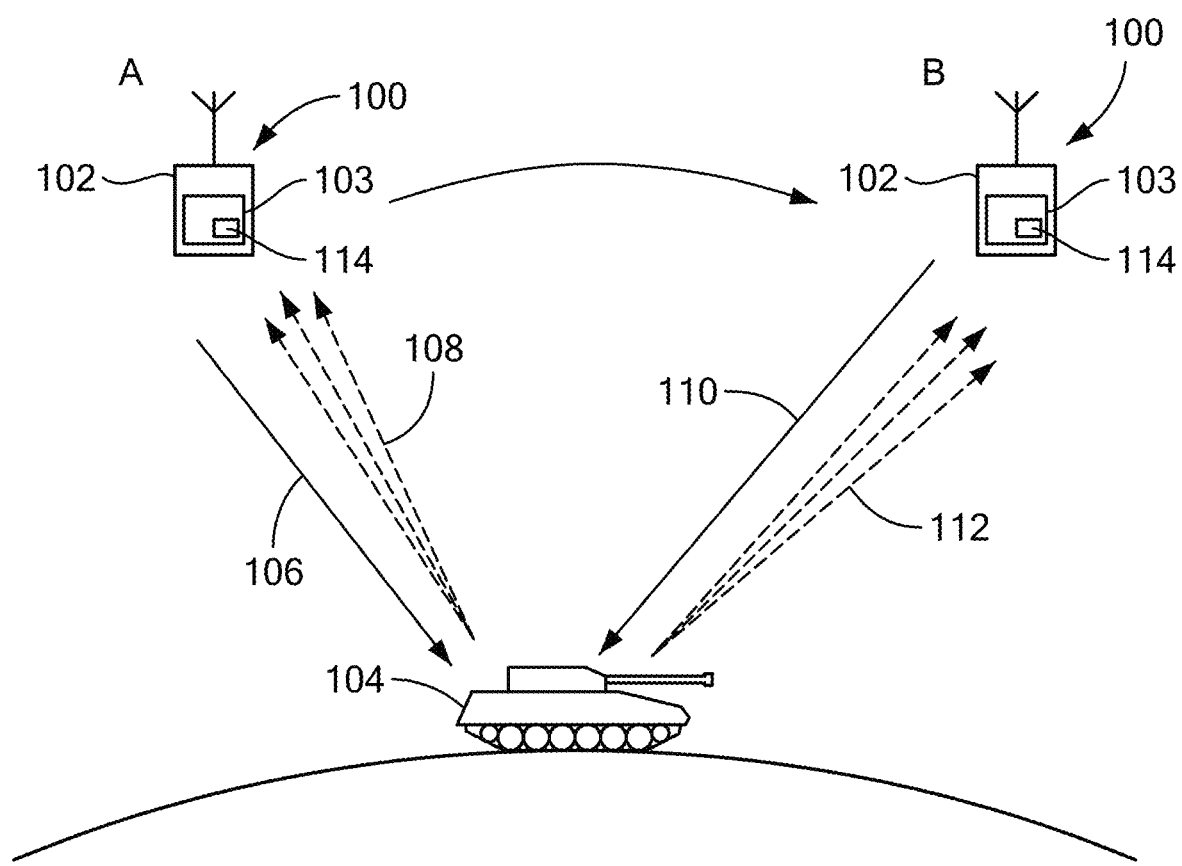
FIG. 1 is a diagram of a radar system that can remove noise from radar images.

FIG. 1 is an example of a system 100 capable of generating two- or three-dimensional reconstructions of objects (e.g. object 104) using radar signals. Thus, system 100 may be referred to as a radar system 100 that can create radar images.

In this example, the radar system 100 comprises a platform 102 capable of moving (e.g., moving from point A to point B in FIG. 1) having a synthetic-aperture radar (SAR) system 103. SAR system 103 may be provided as part of platform 102 (e.g., an integral part of platform 102) or disposed on platform 102. SAR system 103 may be used to create two- or three-dimensional reconstructions of objects such as object 104. That is, system 100 can capture images of an object 104 on the ground (e.g., via SAR system 103) as the platform 102 moves from point A to point B. The images can then be processed to reconstruct a two- or three-dimensional image of object 104.

In the example embodiment of FIG. 1, moving platform 102 is illustrated as a satellite. However, in other embodiments, the platform 102 may be an airplane, a drone, or any other moving object which can include a radar system or which can carry a radar system (e.g. a platform on which a radar system may be disposed). Also, as shown, the object 104 is depicted as a tank. However, any object 104 may be any object that can be detected by radar.

As platform 102 moves from point A to point B, SAR system 103 may capture one or more images of the object 104. For example, when platform 102 is in position A, SAR system 103 may send an RF signal 106 toward object 104, then receive one or more signals 108 corresponding to reflections 108 of that RF signal from object 104 as well as other structures intercepted by the RF signal 106. SAR system 103 may process such reflected signals 108 to generate an image of the object. Reflected signals 108 may include various types of noise including, but not limited to, speckle noise caused by RF scattering surfaces.

In other systems, the platform 102 in a SAR radar system does not need to move. For example, a stationary platform could take radar images of a moving target.

When platform 102 is in position B, SAR system 103 may send a second RF signal 110 toward object 104 and receive one or more reflections 112 of the second RF signal (i.e. reflections from object 104 as well as other structures intercepted by the RF signal 110) which can also be turned into an image. The two images taken at positions A and B can be processed to form a two- or three-dimensional image of object 104. In other examples, SAR system 103 may take one image, two images, or more than two images that can be processed to form a final radar image of object 104.

SAR system 103 may include a noise processor 114 configured to remove the noise from the radar images. noise processing system 114 may be a general-purpose processor, a custom processor, a programmable logic device, a custom circuit, or any other electronic device that is capable of perform logic operations and processing data. In embodiments, noise processing system 114 may include (or may be coupled to) volatile and/or non-volatile storage that can store software instructions. The software instructions may cause noise processing system 114 to perform operations (like those described below) to remove speckle from the radar images captured by platform 102. Noise processing system 114 may remove noise from each image captured at each location A and B, or it may remove noise from the resulting image that is generated after the captured images have been processed to form a final radar image, or both. Noise processing system 114 operates in accordance with the processing described below in conjunction with FIGS. 2A-5.

As noted above, in this example, system 100 comprises a synthetic aperture radar system that generates noisy images that contain speckle or other types of noise. However, one skilled in the art will recognize that the technology for removing noise from a signal described below may be applicable to any radio frequency (RF) system capable of producing images that contain noise. In fact, the technology described herein may be applicable to remove noise from any type of signal that contains noise, not just radar images.

Figure 2A:
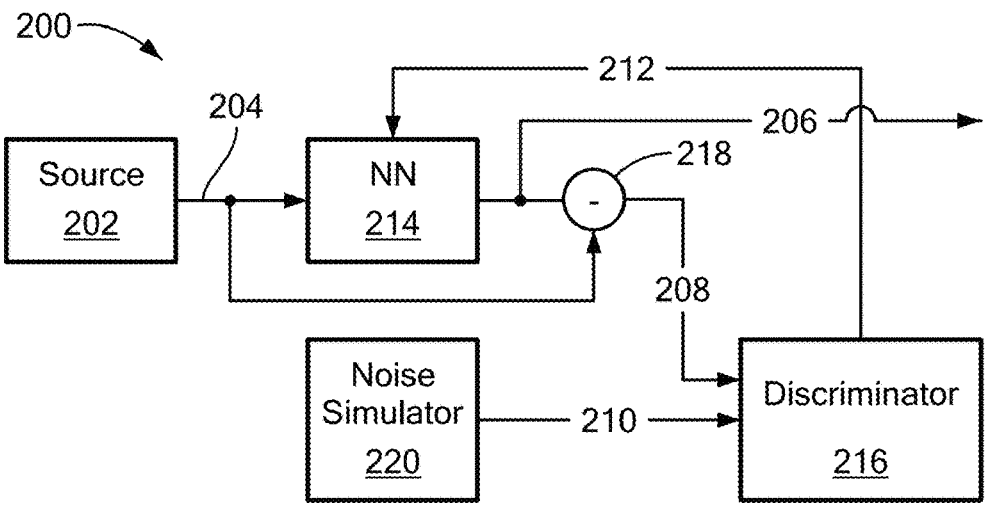
FIGS. 2A and 2B are block diagrams of a processing system for removing noise from radar images or other data signals.

FIG. 2A is a block diagram of a noise processing system 200 which may be the same as or similar to noise processing system 114 described above in conjunction with FIG. 1. Noise processing system 200 that can remove noise from a signal 204. Source 202 is a data source that produces a data signal 204 that includes noise. The data signal can be any type of data such as images, audio, video, sensor readings, etc. The source can be any source that can produce the data signal 204 such as a radar system, a video camera, a microphone, an oscilloscope or sensor, etc. The data signal 204 can be either an analog signal, a digital signal, or a mixed analog and digital signal.

The system 200 includes a neural network 214 that is configured and trained to remove noise from the data signal 204. The neural network then produces an output signal 206 that represents the original data signal 204, but with the noise removed. In embodiments, the neural network 214 is a generative adversarial network. However, the neural network 214 can be replaced or supplemented with other types of neural network including, but not limited to a generative adversarial network ("GAN"), a variational autoencoder ("VAE") network, Flow-based neural network, Diffusion based neural networks, and the like. The neural network 214 may also be a self-training, semi-self training, or unsupervised self-training neural network that trains and becomes better at removing noise from the signal 204 over time. In this instance, the neural network 214 may learn by, essentially, evaluating its performance of removing noise and using that evaluation to further train and improve its ability to remove noise.

To train the neural network 214, the system 200 may include a noise signal module 218 that generates a signal 208 representing the noise that was removed from the original noisy signal 204. In embodiments, module 218 performs a difference function by taking the difference between the original noisy signal 204 and the signal 206 without the noise. By subtracting the signal without the noise (e.g. signal 206) from the original noisy signal 204, the noise signal module 218 produces a noise signal 208 that represents the noise that was removed by the neural network 214 from the original data signal 204. In the case where the data signal 204 represents a two- or three-dimensional image, the noise signal module 218 may perform a pixel-by-pixel subtraction. For example, the value of each pixel in signal 206 may be subtracted from the value of each pixel in signal 204. The resulting pixels are then assembled into noise signal 208, which may be an image representing the noise removed from the original signal 204.

The system 200 may also include a noise simulator module 220 that generates a simulated noise signal 210. The noise signal 210 may be generated so that it shares characteristics with the system 200. For example, if system 200 is a radar system that produces images with speckle, noise simulator 220 may produce a noise signal 210 that is typical of the speckle produced by the radar system. The characteristics of the noise signal 210 may include, but are not limited to: a frequency spectrum of the noise, a power of the noise, a signal to noise ratio, a randomness profile (e.g. normal or non-normal distribution) of the noise, and the like. Noise characteristics such as these may be used by the noise simulator module 220 to generate a noise signal typical of the noise generated by source 202 and/or found in the original signal 204. In certain embodiments, the noise simulator module 220 may use a circularly complex Gaussian noise model to generate the simulated noise signal 210 using a noise function such as the following:

$$n_0(i,j)=N(0,1)+jN(0,1) \tag{1}$$

In equation (1), $n_0$ represents the noise and $N(\mu, \sigma^2)$ represents normally distributed data of mean $\mu$ and variance $\sigma^2$.

The noise simulator may also apply a taper function to the simulated noise signal 210.

$$n(i,j)=\text{conv}(n_0(i,j),F(w(i,j))) \tag{2}$$

In equation (2), n represents the final simulated noise (i.e. the output of the nose simulator 220), "conv" is a convolution function, F( ) is the Fourier transform, and w is the taper function. The taper function w may, for example, be a Taylor window function that may include zero padding.

The equations above may be adapted and modified so that the simulated noise n matches the noise expected from the system generating the data. For example, in an SAR radar system that produces pixelated images, the simulated noise may be superimposed on each pixel of the image to represent speckle from multiple surfaces or point scatters of the objects being detected by the radar. As another example, if the data is an audio signal that is subject to line noise and white noise, the formulas may be adapted to simulate line noise and white noise.

System 200 may also include a discriminator module 216 that compares the noise signal 208 with the simulated noise signal 210 and generates a comparison value signal 212 representing how closely characteristics of the noise signal 208 match characteristics of the simulated noise signal 210. The comparison value 212 is then fed back to the neural network 214 and used to train the neural network 214.

The comparison value may be a score, for example a decimal number ranging from zero to one where one represents a perfect match and zero represents no match between noise signal 208 and the simulated noise signal 210. The comparison value may also be a binary signal with two states: a match state and a no-match state. The comparison value could also be a function or a data stream or any other type of data that can be used to represent a correlation between the noise signal 208 and the simulated noise signal 210.

Recall that noise signal 208 represents the noise removed from signal 204 by neural network 214, and that simulated noise signal 210 represents "expected noise," or noise that is typical of the system 200 and typically present in the data signal 204. Thus, since the comparison value 212 may represent how closely the signals 210 and 208 match, the comparison value can be viewed as a measure of how well the neural network 214 was able to remove noise from the data signal 204. Because the comparison value represents performance of the neural network 214, the comparison value can also be viewed as a loss function that can be used for training the neural network 214. Other loss functions can also be used to train the neural network 214 including, but not limited to: an adversarial loss from the discriminator module 216, a histogram loss from the discriminator module 216, a sum smooth loss (e.g. a difference of sum of the mean filter of signal 208' and the mean value of the simulated noise signal) from the discriminator module 216, a smoothless loss (e.g. a standard deviation measurement of signal 206') from the neural network 214, and the like.

In embodiments, the discriminator module 216 may be a circuit or processor configured to compare one or more characteristics of the noise signal 208 to one or more characteristics of the simulated noise signal 220. For example, the discriminator module 216 may generate a frequency spectrum (e.g. a Fourier transform) of the noise signal 208 and a frequency spectrum of the simulated noise signal 220. It may then calculate a difference between the frequency spectrums, which can be used as the comparison value 212, or as an input to a function that computes the comparison value 212. It may also compare a histogram of the noise signal 208 with a histogram of the simulated noise signal 220.

In other embodiments, the discriminator module 216 may be implemented as a second neural network that is configured to detect whether noise signal 208 matches simulated noise signal 210. In embodiments, the discriminator module 216 may be a discriminatory neural network trained to detect matching noise signals. In this case, the comparison value 212 represents the discriminatory neural network's determination of the correlation between characteristics of the noise signal 208 and the simulated noise signal 210.

In embodiments, the neural network 214, difference module 218, noise simulator module 220, and discriminator module 216 may be instantiated by one or more processors, such as noise processing system 114 (see FIG. 1). As described above, the modules shown in FIG. 2A can be implemented as custom circuitry, programmable hardware, and/or as software stored in computer memory and executed by a processor.

Figure 2B:
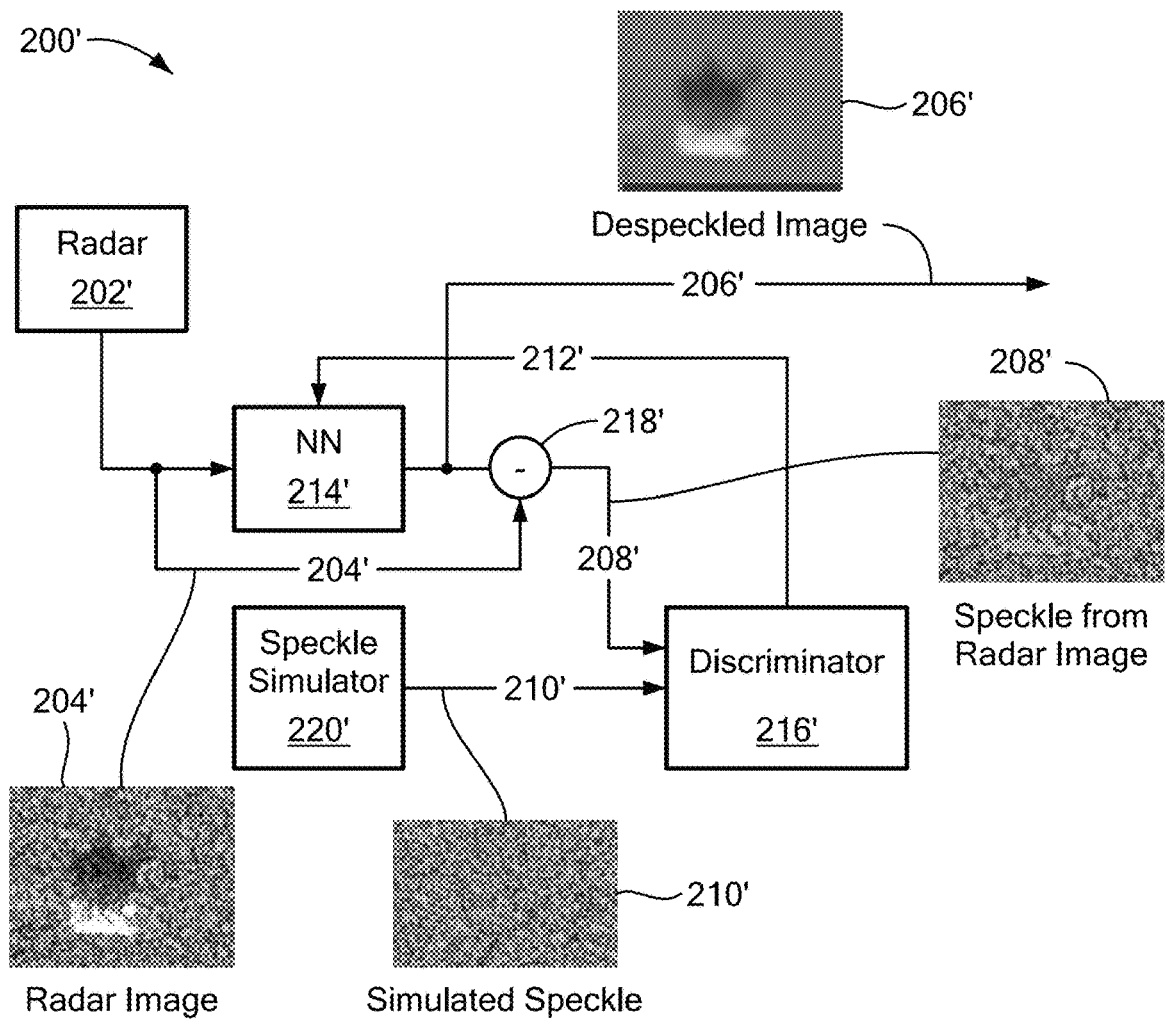

FIG. 2B is a block diagram of a system 200' that is similar to system 200, but has been applied, adapted, and/or configured to remove noise from radar images. In embodiments, system 200' may remove speckle noise from radar images, but could also remove (and/or be configured to remove) other types of noise. Radar 202' is a radar that produces a images (e.g. image 204') that includes noise. In embodiments, radar 202' may be a SAR radar like the one above described in relation to FIG. 1. The radar image 204' can be either an analog signal, a digital signal, or a mixed analog and digital signal. Typically, the image 204' may be a digital image.

Radar system 200' includes a neural network 214' that may be the same as or similar to neural network 214. Neural network 214' may be configured and trained to remove speckle (or other types of noise) from the radar image 204'. The neural network then produces an output image 206' that represents the original image 204', but with the noise removed. In embodiments, the neural network 214' is a generative adversarial network, but may comprise other types of neural networks as listed above. The neural network 214' may also be a self-training, semi-self training, or unsupervised self-training neural network that trains and, over time, becomes better at removing speckle from images like image 204'. In this instance, the neural network 214' may learn by, essentially, evaluating its own performance of removing speckle from radar images.

To train the neural network 214', the system 200' may include a speckle signal module 218' that generates a speckle image 208' which represents the speckle that was removed from the image 204'. In embodiments, module 218' performs a difference function by taking the difference between the original image 204' and the processed image 206' without the speckle. By subtracting the processed image 206' from the original image 204', the result is a speckle image 208' that contains just the speckle that was removed from the original image 204' by the neural network 214'. In the case where the original image 204' is a two- or three-dimensional image, the speckle signal module 218' may perform a pixel-by-pixel subtraction. For example, the value of each pixel in image 206' may be subtracted from the value of each pixel in image 204'. The resulting pixels are then assembled into speckle image 208', which may be an image representing the noise removed from the original image 204'.

The system 200' may also include a speckle simulator module 220' that generates a simulated speckle image 210'. The simulated speckle image 210' may be generated so that it shares characteristics with the system 200'. For example, if radar 202' produces images with speckle with certain characteristics, speckle simulator 220' may produce a speckle image 210' that includes those characteristics and is typical of the speckle produced by the radar system. The characteristics of the speckle image 210' may include characteristics that are similar to those produced by the radar system 200' including, but not limited to: a frequency spectrum of the speckle, a power of the speckle, a signal to noise ratio, a randomness profile (e.g. normal or non-normal distribution) of the of the speckle, and the like.

System 200' may also include a discriminator module 216' that compares the speckle image 208' with the simulated speckle image 210' and generates a comparison value signal 212' representing how closely characteristics of the speckle image 208' match characteristics of the simulated speckle image 210'. The comparison value 212' is then fed back to the neural network 214' and used to train the neural network 214'.

The comparison value may be a score, for example a decimal number ranging from zero to one where one represents a perfect match and zero represents no perceived match between speckle image 208' and the simulated speckle image 210'. The comparison value may also be a binary signal with two states: a match state and a no-match state. The comparison value could also be a function or a data stream or any other type of data that can be used to represent a correlation between the speckle image 208' and the simulated speckle image 210'.

Recall that speckle signal 208' represents the noise removed from the original image 204' by neural network 214', and that the simulated speckle signal 210' represents "expected speckle," or speckle that is typical of the system 200' and typically present in image 204'. Thus, since the comparison value 212' may represent how closely the images 210' and 208' match, the comparison value can be viewed as a measure of how well the neural network 214' was able to remove speckle from the original image 204'. Because the comparison value represents performance of the neural network 214', the comparison value can also be viewed as a loss function that can be used for training the neural network 214'.

In embodiments, the discriminator module 216' may be a circuit or processor configured to compare one or more characteristics of the speckle image 208' to one or more characteristics of the simulated speckle image 220'. For example, the discriminator module 216' may generate a frequency spectrum of the speckle in speckle image 208' and a frequency spectrum of the speckle in simulated speckle signal 220'. It may then calculate a difference between the frequency spectrums, which can be used as the comparison value 212', or as an input to a function that computes the comparison value 212'. It may also compare (e.g. calculate a difference between) a histogram of the speckle in speckle image 208' with a histogram of the simulated speckle signal 220'.

In other embodiments, the discriminator module 216' may be implemented as a second neural network that is configured to detect whether speckle image 208' matches simulated speckle image 210'. In embodiments, the discriminator module 216' may be a discriminatory neural network trained to detect matching speckle signals. In this case, the comparison value 212' represents the discriminatory neural network's determination of the correlation between characteristics of the speckle in speckle image 208' and characteristics of the speckle in simulated speckle image 210'.

In embodiments, the neural network 214', difference module 218', noise simulator module 220', and discriminator module 216' may be instantiated by one or more processors, such as processor 114 (see FIG. 1). As described above, the modules shown in FIG. 2A can be implemented as custom circuitry, programmable hardware, and/or as software stored in computer memory and executed by a processor.

In embodiments, other data may also be used to train the neural network 214/214'. These data may include, but are not limited to FIG. 3 is a block diagram of an example architecture 300 of a neural network (e.g. neural network 214 or 214' in FIGS. 2A, 2B). In this example, the neural network is implemented as a convolutional neural network ("CNN") which may be well suited to process two-dimensional image data. CNN networks may also be used for processing one- and three-dimensional data. Additional y or alternatively, other neural network architectures may be used to implement the neural networks described above. However, in this example, a CNN is shown.

The neural network includes an input layer 302 that receives the noisy data. A concatenation layer 304, a plurality of residual blocks 306-312, and a convolution layer 314, and an output layer 316.

In embodiments, the one or more of the residual blocks 306-312 may include a skip connection (e.g. a connection that by passes some or all of the processing within one or more of the residual blocks) that can improve training of the neural network. Also, the neural network a may be configured to process the input data without up- or down-sampling the data. For example, if the neural network is removing speckle from an image, the neural network may be configured to process the image without changing the size or resolution of the image. This results in the neural network being able process any side data input (e.g. any size image) after the neural network is trained.

FIG. 4 is a block diagram of an example architecture 400 for a neural network that can be used as a discriminator network to compare the noise signal (e.g. signal 208 in FIG. 2) with the simulated noise signal (e.g. simulated noise signal 210 in FIG. 2). In embodiments, the neural network architecture 400 can be used to perform the functions of the discriminator module 216 or 216' described above. The architecture 400 for the discriminator module may be the same as or similar to architecture 300 for the noise removing neural network 214, 214'. In embodiments, the neural network architecture 400 may perform an inverse function relative to the neural network architecture 300.

The neural network includes an input layer 402 that receives the simulated noise signal 210 and the noise signal 208, as well as a convolution layer 406, a plurality of residual blocks 408-418, a convolution and average pooling layer 418, a fully connected layer 420, and an output layer 422. The output layer 422 provides a comparison value signal (e.g. comparison value 212) that represents a correspondence between characteristics of the noise signal and characteristics of the simulated noise signal, as described above.

In embodiments, the one or more of the residual blocks 406-418 may include a skip connection (e.g. a connection that by passes some or all of the processing within one or more of the residual blocks) that can improve training of the neural network. Also, the neural network a may be configured to process the input data without up- or down-sampling the data. For example, if the neural network is comparing a speckle image with a simulated speckle image, the neural network may be configured to process the images and generate a comparison value without changing the size or resolution of the images. This results in the neural network being able process any side data input (e.g. any size image) after the neural network is trained.

Figure 5:
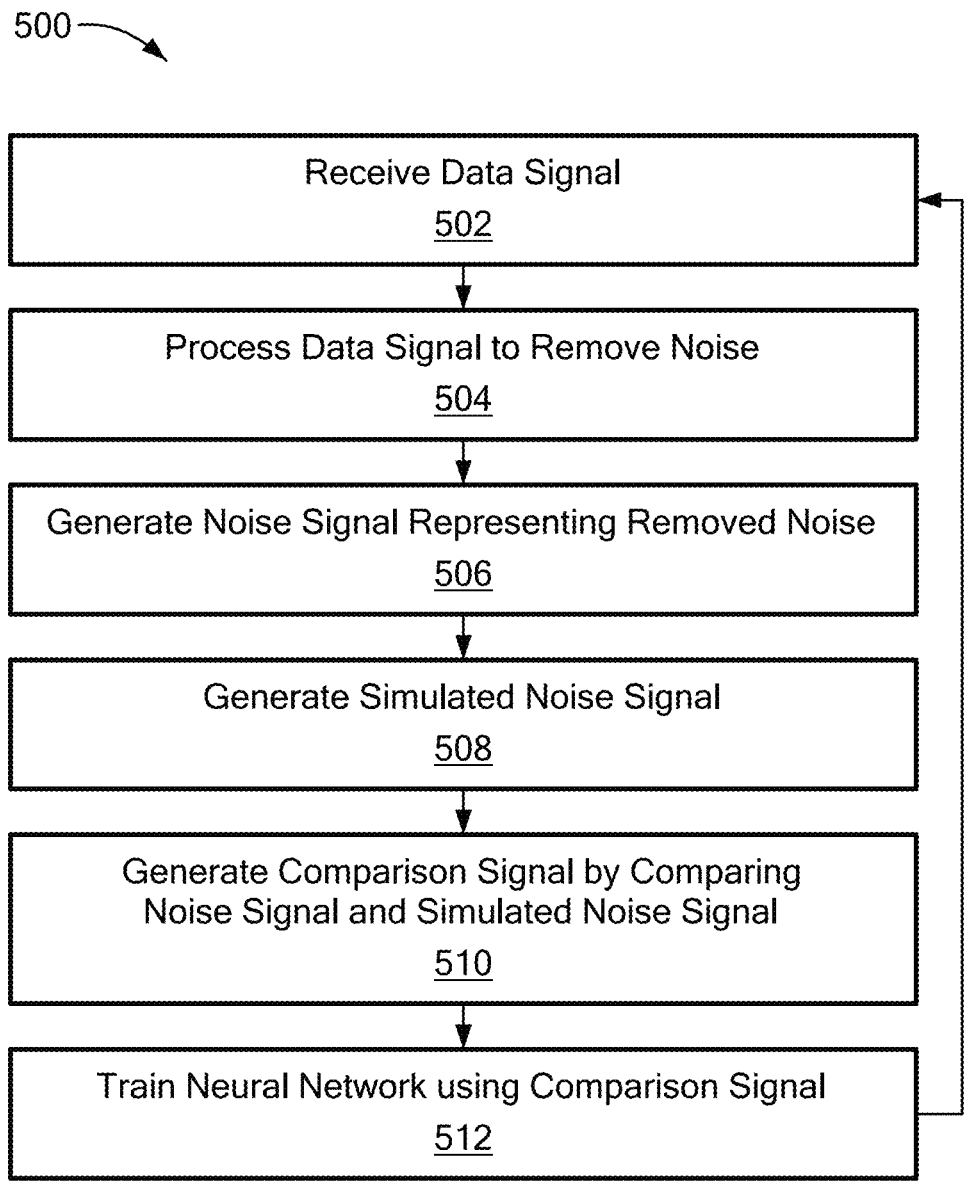
FIG. 5 is a flow diagram of a process for training a neural network to remove noise from a data signal.

FIG. 5 a flow diagram showing illustrative processing that can be implemented within a system 100 (FIG. 1) and, more particularly, within a noise processing system such as any of the illustrative noise processing systems describer above in conjunction with FIG. 1, 2A, 2B. Rectangular elements (typified by element 502), are herein denoted "processing blocks," and represent computer software instructions or groups of instructions. Alternatively, the processing blocks may represent steps or processes performed by functionally equivalent circuits such as a neural network, a digital signal processor circuit or an application specific integrated circuit (ASIC). The flow diagram does not depict the syntax of any particular programming language, but rather illustrates the functional information one of ordinary skill in the art requires to fabricate circuits or to generate computer software or any type of code to perform the processing described. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered, meaning that, when possible, the functions represented by the blocks can be performed in any convenient or desirable order.

Referring now to both FIGS. 5 and 2, a process 500 for removing noise from a data signal is shown as a flow diagram. In block 502, the system for removing noise (e.g. system 200) receives the noisy data input signal 204 from a data source 202. In block 504 the data is processed, for example by neural network 214, to remove the noise from the data signal. In block 506, a noise signal is generated, for example by noise signal module 218, that represents the noise that was removed from the data signal in block 504.

In block 508, a simulated noise signal is generated by noise simulator module 220. And in block 510, a comparison signal is generated by discriminator module 216. As noted above, the comparison signal represents how closely characteristics of the noise signal 208 correspond to characteristics of the simulated noise signal 210.

In block 512, the comparison signal is used to train the neural network 214, which improves the neural network's ability to remove noise from subsequently received data signals. The process then repeats by receiving another data signal in block 502.

One skilled in the art will understand that the flowchart illustrated in FIG. 5 is an example only. In embodiments, the functions of each block may be performed in different orders as appropriate. Some or all the functions may also be performed serially, simultaneously, in a pipeline fashion, or using any other appropriate schedule to perform the functions.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether or not explicitly described.

Relative or positional terms including, but not limited to, the terms "upper," "lower," "right," "left," "vertical," "horizontal, "top," "bottom," and derivatives of those terms relate to the described structures and methods as oriented in the drawing Figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

The invention claimed is:

1. A method for removing noise from a data signal, the method comprising:
   (a) receiving a first data signal that contains noise;
   (b) removing, by a neural network, the noise from the first data signal to produce a processed data signal that represents the first data signal without the noise;
   (c) calculating, from the first data signal and the processed data signal, a first noise signal representing the noise from the first data signal;
   (d) generating a simulated noise signal;
   (e) generating a comparison value by comparing the first noise signal and the simulated noise signal, the comparison value representing a correspondence between characteristics of the first noise signal and the simulated noise signal; and (f) training the neural network using the comparison value to improve performance of the neural network in producing the processed data signal.

2. The method of claim 1 wherein generating the simulated noise signal comprises generating the simulated noise signal having characteristics corresponding to characteristics of the first noise signal.

3. The method of claim 1 wherein the first data signal represents an image having pixels, and generating the simulated noise signal comprises simulating noise by superimposing effects of multiple point scatterers in one or more pixels of the image.

4. The method of claim 1 wherein generating the simulated noise signal comprises simulating noise using a circularly complex Gaussian noise model.

5. The method of claim 1 wherein generating the simulated noise signal comprises applying a taper function to the simulated noise signal.

6. The method of claim 1 wherein training the neural network further includes training the neural network with one or more of: an adversarial loss value, a histogram loss value, a sum smooth loss value, or a smoothness loss value.

7. The method of claim 1 wherein the first data signal represents an image and calculating the first noise signal comprises calculating a difference between the first data signal and the processed data signal.

8. The method of claim 1 wherein:
the first data signal represents a radar image;
the noise contained in the first data signal comprises speckle; and
the simulated noise signal contains speckle.

9. The method of claim 1 wherein the step of generating the comparison value is performed by a second neural network.

10. The method of claim 1 wherein:
receiving the first data signal comprises receiving the first data signal from a system that produced the noise; and
generating the simulated noise signal comprises generating the simulated noise signal to have one or more noise characteristics in common with the system.

11. The method of claim 10 wherein the one or more noise characteristics include at least one of:
a frequency spectrum of the noise;
a power of the noise;
a signal to noise ratio; and
a randomness profile.

12. A system for removing noise from a data signal, the system comprising:
a first neural network configured to:
receive a first data signal that includes noise;
process the first data signal to produce a processed data signal representing the first data signal without the noise; and
a processor configured to:
generate a noise signal representing the noise included in the first data signal;
generate a simulated noise signal; and
compare the noise signal with the simulated noise signal to generate a comparison value that represents a correspondence between characteristics of the noise signal and characteristics of the simulated noise signal;
wherein the first neural network is trained with the comparison value to improve an ability of the first neural network to remove noise from data signals.

13. The system of claim 12 wherein the processor is configured to implement a second neural network, the second neural network configured to compare the noise signal with the simulated noise signal and generate the comparison value.

14. The system of claim 13 wherein the second neural network is a discriminatory neural network.

15. The system of claim 12 wherein the first neural network is further configured to produce a second data signal representing the first data signal without the noise.

16. The system of claim 12 wherein the processor is configured to generate the noise signal by calculating a difference between the first data signal and the processed data signal.

17. The system of claim 12 wherein the first data signal represents a radar image and the noise is speckle in the radar image.

18. The system of claim 12 wherein the first neural network is a self-supervised training network.

19. The system of claim 12 wherein the first neural network is a generative adversarial network.

20. The system of claim 12 wherein generating the simulated noise signal comprises using a circularly complex Gaussian noise model.

21. In a radar system, a method of training a neural network to remove speckle from radar images, the method comprising:
receiving data representing a radar image;
removing, by the neural network, speckle from the data representing the radar image to produce a despeckled image;
generating a speckle signal by subtracting the despeckled image from the radar image;
generating a simulated speckle signal;
comparing the speckle signal to the simulated speckle signal to generate a comparison value representing a correspondence between characteristics of the speckle signal and characteristics of the simulated speckle signal; and
training the neural network with the comparison value.

22. The method of claim 21 wherein the neural network is a generative adversarial network.

23. In a radar system, a method of despeckling a radar image, the method comprising:
receiving data representing a radar image;
processing, by a neural network, the received data to remove speckle from the radar image to produce processed data that represents the radar image without the speckle;
generating, from the received data and the processed data, a speckle signal representing the removed speckle;
generating a simulated speckle signal;
generating a comparison value by comparing the speckle signal to the simulated speckle signal; and
using the comparison value to train the neural network to improve an ability of the neural network to remove speckle from radar images.

* * * * *